(12) United States Patent
Kapas et al.

(10) Patent No.: US 9,146,167 B2
(45) Date of Patent: Sep. 29, 2015

(54) TORQUE SENSOR ASSEMBLY FOR A MOTOR VEHICLE AND METHOD OF MEASURING TORQUE

(71) Applicant: Ford Global Technologies, LLC, Dearborn, MI (US)

(72) Inventors: Nimrod Kapas, Canton, MI (US); Gregory Jack Overla, Huntington Wooods, MI (US); Joseph F. Kucharski, Livonia, MI (US); Gregory Michael Pietron, Canton, MI (US); Yujii Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 14/193,298

(22) Filed: Feb. 28, 2014

(65) Prior Publication Data

US 2015/0247768 A1    Sep. 3, 2015

(51) Int. Cl.
| | |
|---|---|
| *G01L 3/02* | (2006.01) |
| *G01L 3/10* | (2006.01) |
| *G01D 5/14* | (2006.01) |
| *G01P 1/04* | (2006.01) |

(52) U.S. Cl.
CPC ............... *G01L 3/103* (2013.01); *G01D 5/145* (2013.01); *G01P 1/04* (2013.01)

(58) Field of Classification Search
CPC ........... G01L 3/102; G01D 5/145; G01P 1/04
USPC ........................ 73/862.193, 862.332–862.335
See application file for complete search history.

(56) References Cited

U.S. PATENT DOCUMENTS

| | | | |
|---|---|---|---|
| 4,090,131 A * | 5/1978 | Mas | 324/146 |
| 4,135,390 A | 1/1979 | Templin | |
| 5,031,455 A * | 7/1991 | Cline | 73/379.01 |
| 5,209,623 A | 5/1993 | Krehnovi | |
| 6,047,605 A | 4/2000 | Garshelis | |
| 6,051,969 A * | 4/2000 | Kobayashi et al. | 324/174 |
| 6,145,387 A | 11/2000 | Garshelis | |
| 6,163,148 A * | 12/2000 | Takada et al. | 324/226 |
| 6,490,934 B2 | 12/2002 | Garshelis | |
| 6,513,395 B1 * | 2/2003 | Jones | 73/862.333 |
| 6,553,847 B2 | 4/2003 | Garshelis | |
| 7,134,329 B2 | 11/2006 | Ha | |
| 7,172,380 B2 | 2/2007 | Lees et al. | |
| 7,219,564 B1 * | 5/2007 | May | 73/862.333 |
| 7,389,682 B2 | 6/2008 | JaVaherian | |

(Continued)

FOREIGN PATENT DOCUMENTS

DE    19857232    1/2000

*Primary Examiner* — Max Noori
(74) *Attorney, Agent, or Firm* — Diederiks & Whitelaw, PLC

(57) ABSTRACT

A torque sensor assembly is used to measure torque in a powertrain of a motor vehicle, the powertrain including a power source and a transmission. A sensor is coupled to an oil seal housing, which is coupled to the engine. Each of the sensor and the oil seal housing has a mounting hole formed therein. The sensor is coupled to the oil seal housing, and the oil seal housing to the engine, by inserting one fastener into both mounting holes. The sensor measures an amount of torque exerted on a drive plate of the transmission. The drive plate includes a central disk, made of a magnetizable material, and an outer ring coupled to the central disk. The sensor is a magnetic torque sensor, which determines an amount of torque exerted on the central disk of the drive plate by sensing a magnetic flux passing through the drive plate.

19 Claims, 7 Drawing Sheets

(56) References Cited

U.S. PATENT DOCUMENTS

| | | |
|---|---|---|
| 7,478,572 B2 | 1/2009 | Maten et al. |
| 8,079,936 B2 | 12/2011 | MacFarlane et al. |
| 2003/0062890 A1* | 4/2003 | Tokumoto ................ 324/207.25 |
| 2003/0106766 A1* | 6/2003 | Johnson et al. ............ 192/103 R |
| 2003/0136604 A1* | 7/2003 | Yamanaka et al. ............. 180/444 |
| 2004/0031332 A1* | 2/2004 | May ........................ 73/862.335 |
| 2004/0117969 A1 | 6/2004 | Avery et al. |
| 2004/0170344 A1* | 9/2004 | Tajima et al. ................. 384/448 |
| 2004/0237681 A1 | 12/2004 | Wheals et al. |
| 2011/0126639 A1* | 6/2011 | Behrens ................... 73/862.193 |
| 2011/0179905 A1 | 7/2011 | Tanba et al. |
| 2012/0297895 A1 | 11/2012 | Kapas et al. |
| 2013/0091960 A1 | 4/2013 | Lee |
| 2013/0263654 A1 | 10/2013 | Pietron et al. |

* cited by examiner

US 9,146,167 B2

TORQUE SENSOR ASSEMBLY FOR A MOTOR VEHICLE AND METHOD OF MEASURING TORQUE

BACKGROUND OF THE INVENTION

The present invention pertains to torque sensors for automatic transmissions, and, more particularly, to the packaging of torque sensors near drive plate disks of dual clutch automatic transmissions.

An automatic transmission of a vehicle generally includes an input shaft and an output shaft. The input shaft receives an input torque from a power source, such as an internal combustion engine or an electric motor. The transmission then converts the input torque to an output torque. The output shaft transmits the output torque to the wheels of the vehicle in order to propel the vehicle.

The transmission typically converts the input torque to the output torque by adjusting a gear ratio (for example, during an upshift or a downshift) between the input shaft and the output shaft. This adjustment is accomplished by applying or releasing friction elements, such as clutches or brakes, in order to change torque relationships by altering planetary gear configurations of the transmission. Alternatively, in a transmission having one or more layshafts, the gears associated with the layshafts are used to change torque relationships. As a result, power flow paths are established and disestablished from the engine to the wheels.

The friction elements must be properly controlled in order to satisfactorily shift the transmission. To this end, information regarding the operation of the engine and transmission is generally used to control the friction elements. Typically, some of this information is estimated rather than directly measured. Direct measurement is preferred because it is more accurate. However, it is often more difficult to obtain direct measurements due to size constraints and other factors.

In the context of a dual-clutch automatic transmission, direct measurement of the operation of the engine and transmission is beneficial because accurate clutch slip control, through coordinated engine torque and clutch capacity control, is required in order to minimize drivability and noise, vibration and harshness (NVH) issues. In particular, a direct measurement of torque would be beneficial at a drive plate of the dual-clutch transmission in order to better understand engine and clutch torque relationships during a vehicle launch or gear shift. A direct measurement of torque can also improve clutch control by reducing hysteresis and temperature effects and increasing the accuracy of a clutch transfer function in terms of torque-to-actuator position.

Based on the above, there exists a need in the art for a way to directly measure torque at a drive plate of a dual-clutch automatic transmission.

SUMMARY OF THE INVENTION

The present invention is directed to a torque sensor assembly for a motor vehicle and a method of measuring torque with the sensor assembly. In a preferred embodiment, the motor vehicle comprises a power source, such as an internal combustion engine, and a transmission. A sensor is coupled to an oil seal housing which is, in turn, coupled to the engine. Each of the sensor and the oil seal housing has a mounting hole formed therein. The sensor is coupled to the oil seal housing, and the oil seal housing to the engine, by inserting one fastener into both mounting holes. The sensor is configured to measure an amount of torque exerted on a drive plate of the transmission. The drive plate includes a central disk, made of a magnetizable material, and an outer ring coupled to the central disk. Specifically, the sensor is a magnetic torque sensor, which determines an amount of torque exerted on the central disk of the drive plate by sensing a magnetic flux passing through the drive plate.

In one preferred embodiment, the central disk is formed from a first material and the outer ring is formed from a second material that is different from the first material, the first material preferably being stronger than the second material, which enables the central disk to be thinner than the outer ring. In another preferred embodiment, the drive plate is assembled by press-fitting the central disk and the ring to one another.

In yet another preferred embodiment, the sensor is a magneto-elastic torque sensor that has magnetic flux sensing elements, such as fluxgate sensors. In such an embodiment, the sensor measures torque exerted on the central disk by measuring, via the magnetic flux sensing elements, an intensity of a magnetic flux passing through the central disk.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
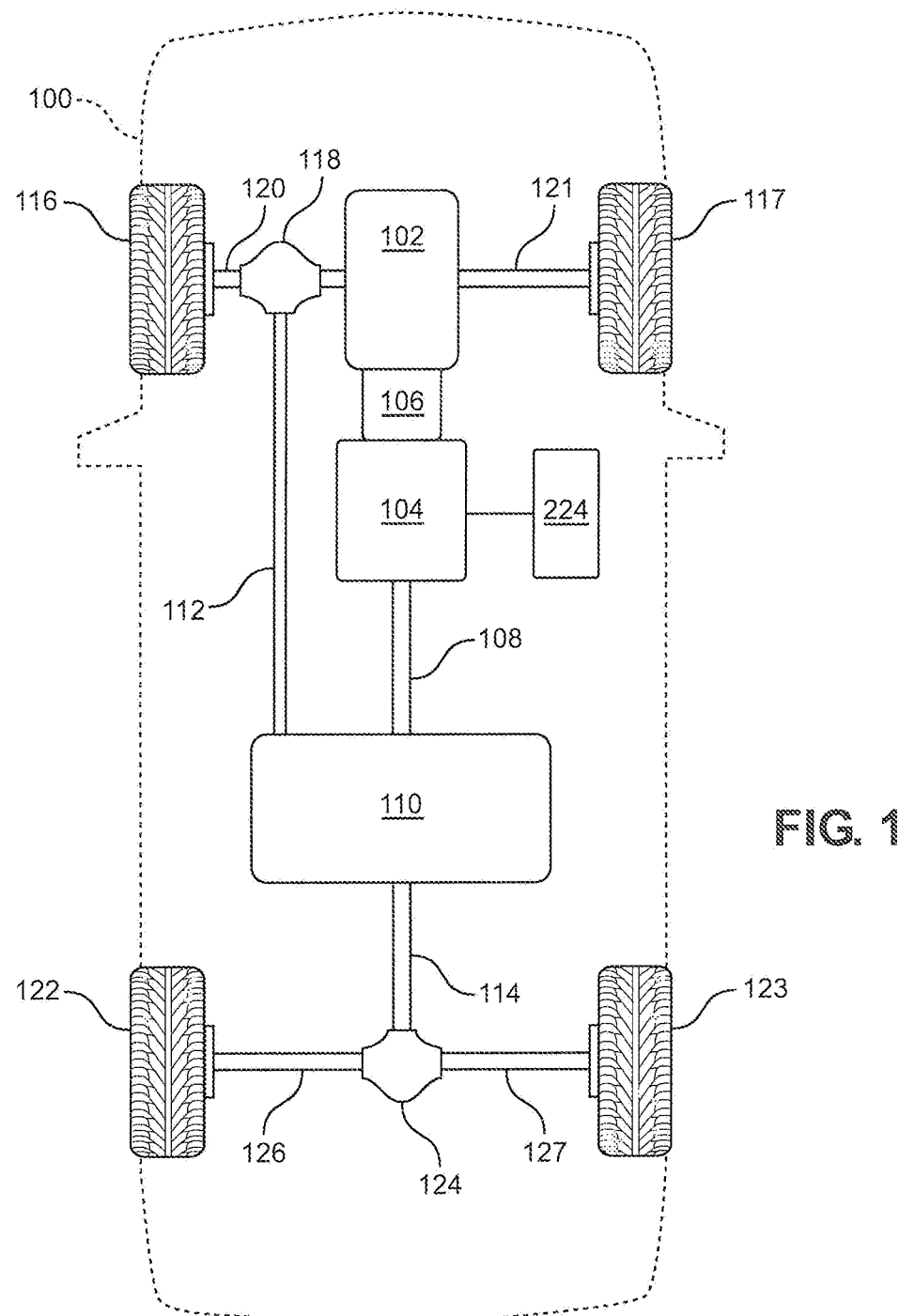
FIG. 1 is a schematic view of a vehicle driveline in accordance with the present invention.

With initial reference to FIG. 1, there is shown a vehicle 100 with a power source 102, such as an internal combustion engine or an electric motor, connected to a transmission 104. A sensor assembly 106, which will be discussed in detail below, is located between power source 102 and transmission 104. An output shaft 108 connects transmission 104 to a transfer case 110, which selectively transmits power to a front driveshaft 112 and a rear driveshaft 114. Front driveshaft 112 transmits power to front wheels 116, 117 via a front differential assembly 118 and front half shafts 120, 121. Rear driveshaft 114 transmits power to rear wheels 122, 123 via a rear differential assembly 124 and rear half shafts 126, 127. As a result, vehicle 100 operates in either a two-wheel drive mode (when power is transmitted to one of front driveshaft 112 and rear driveshaft 114) or a four-wheel drive mode (when power is transmitted to both front drive shaft 112 and rear driveshaft 114). However, other configurations are usable in connection with the present invention. For example, in one embodiment, vehicle 100 is front- or rear-wheel drive and does not have transfer case 110. In another embodiment, vehicle 100 is all-wheel drive. Additionally, power source 102 does not need to be located in a front portion of vehicle 100, but can instead be located elsewhere, as in a rear- or a mid-engine embodiment.

Figure 2:
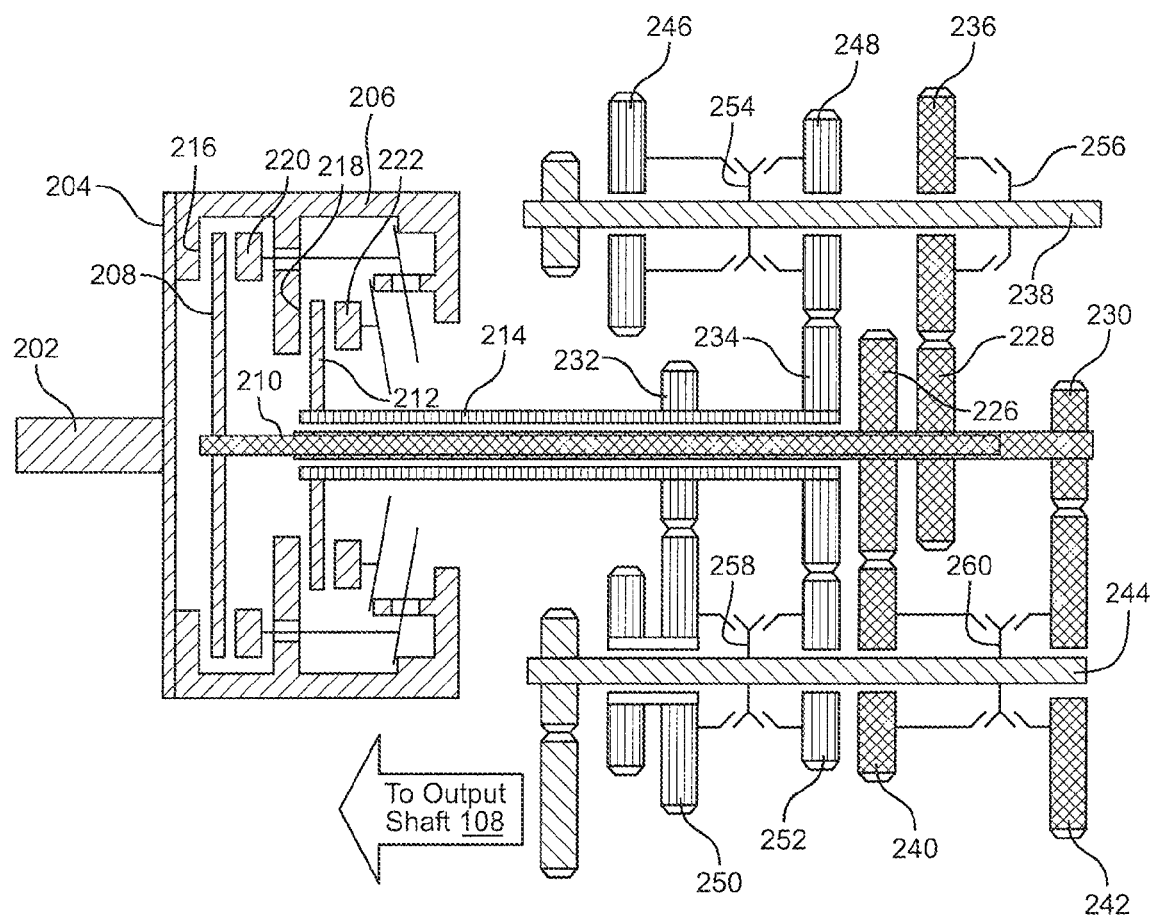
FIG. 2 is a schematic view of a dual clutch automatic transmission used in accordance with the present invention.

Referring now to FIG. 2, there is illustrated transmission 104 which, in this embodiment, is a dual-clutch automatic transmission. Power source 102 transmits power to transmission 104 through a crankshaft 202 which converts a linear displacement of engine components (not shown) into rotational displacement of crankshaft 202. Crankshaft 202 is coupled to a drive plate 204 which is, in turn, coupled to a clutch housing 206. Inside clutch housing 206 there is a first clutch disk 208 coupled to a first input shaft 210, a second clutch disk 212 coupled to a second input shaft 214, a first friction surface 216, a second friction surface 218, a first pressure plate 220 and a second pressure plate 222. First clutch disk 208, first friction surface 216 and first pressure plate 220 collectively define a first clutch, while second clutch disk 212, second friction surface 218 and second pressure plate 220 collectively define a second clutch. Rotation of crankshaft 202 results in rotation of drive plate 204 and, hence, clutch housing 206. In order to cause rotation of first clutch disk 208, first pressure plate 220 must move to the left so as to press first clutch disk 208 against first friction surface 216. As a result, rotation of clutch housing 206 will cause rotation of first clutch disk 208, along with first input shaft 210 coupled thereto. Similarly, second clutch disk 212 is rotated by moving second pressure plate 222 to the left so as to press second clutch disk 212 against second friction surface 218. Rotation of clutch housing 206 will then cause rotation of second clutch disk 212, along with second input shaft 214 coupled thereto.

An electronic transmission control module (TCM) 224, shown in FIG. 1, controls the first and second clutches through command signals sent to solenoid-actuated servos (not shown), which move pressure plates 220, 222, in a manner known in the art, TCM 224 includes a microprocessor accessible to electronic memory and containing control algorithms expressed in computer code, which are executed repeatedly at frequent intervals.

Referring back to FIG. 2, first input shaft 210 has gears 226, 228, 230 coupled thereto, while second input shaft 214 has gears 232, 234 coupled thereto. Power is selectively transmitted from first input shaft 210 through gears 226, 228, 230 to gear 236 of a first layshaft 238 and gears 240, 242 of a second layshaft 244. Similarly, power is selectively transmitted from second input shaft 214 through gears 232, 234 to gears 246, 248 of first layshaft 238 and gears 250, 252 of second layshaft 244. In one embodiment, gear 236 is associated with a third gear; gear 240 is associated with a fifth gear; gear 242 is associated with a first gear; gear 246 is associated with a reverse gear; gear 248 is associated with a fourth gear; gear 250 is associated with a second gear; and gear 252 is associated with a sixth gear.

First layshaft 238 also includes synchronizers 254, 256. Synchronizer 254 moves left to engage gear 246 and driveably connect gear 246 to first layshaft 238, and synchronizer 254 moves right to engage gear 248 and driveably connect gear 248 to first layshaft 238. Synchronizer 256 moves left to engage gear 236 and driveably connect gear 236 to first layshaft 238. Synchronizers 258, 260 of second layshaft 244 operate in the same manner. Synchronizer 258 moves left to engage gear 250 and driveably connect gear 250 to second layshaft 244, and synchronizer 258 moves right to engage gear 252 and driveably connect gear 252 to second layshaft 244. Synchronizer 260 moves left to engage gear 240 and driveably connect gear 240 to second layshaft 244, and synchronizer 260 moves right to engage gear 242 and driveably connect gear 242 to second layshaft 244.

In connection with the above description, the terms "left" and "right" are used merely for illustrative purposes and are intended to aid the reader when referring to FIG. 2 specifically, rather than dual-clutch automatic transmissions generally.

First gear is produced by using synchronizer 260 to driveably connect gear 242 to second layshaft 244 and then engaging first clutch disk 208. Power produced by power source 102 is transmitted by a first power path, which includes crankshaft 202, drive plate 204, clutch housing 206, first clutch disk 208, gear 230, gear 242 and output shaft 108 (not shown in FIG. 2). As discussed in connection with FIG. 1, output shaft 108 is driveably connected to front or rear wheels 116, 117, 122, 123 of vehicle 100. Transmission 104 is then prepared for an upshift to second gear by using synchronizer 258 to driveably connect gear 250 to second layshaft 244. In second gear, power produced by power source 102 is transmitted through a second power path, which includes crankshaft 202, drive plate 204, clutch housing 206, second clutch disk 212, gear 232, gear 250 and output shaft 108.

In response to TCM 224 producing a command for an upshift to second gear, a torque transfer between first clutch disk 208 and second clutch disk 212 occurs whereby torque transmitted by off-going first clutch disk 208 decreases until first clutch disk 208 is fully disengaged and torque transmitted by oncoming second clutch disk 212 increases prior to second clutch disk 212 becoming fully engaged. Upshifts and downshifts between other gears occur in an analogous manner.

Figure 3:
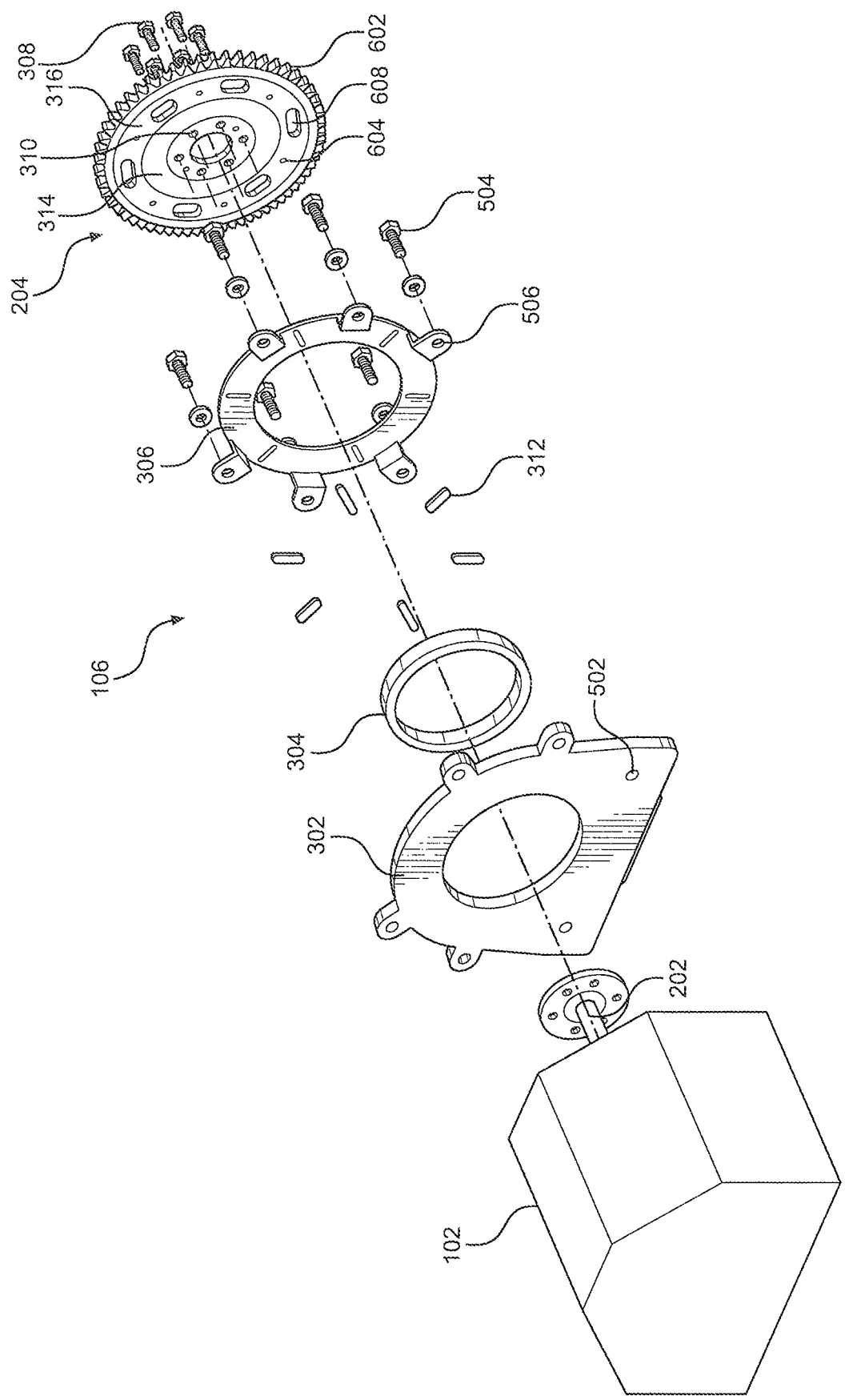
FIG. 3 is an exploded, perspective view of an engine, sensor module and drive plate in accordance with the present invention.

With reference now to FIG. 3, power source 102, which is an internal combustion engine in this embodiment, is shown along with sensor assembly 106. Sensor assembly 106 comprises an oil seal housing 302, an oil seal 304, a sensor module 306 and drive plate 204. Drive plate 204 is coupled to crankshaft 202 by inserting fasteners 308, such as bolts, into crankshaft mounting holes 310, formed in drive plate 204. As a result, when crankshaft 202 rotates, drive plate 204 will also rotate. Oil seal 304 is provided in order to prevent lubricating oil from leaking from power source 102 at the point where crankshaft 202 extends from power source 102. Oil seal housing 302 helps secure oil seal 304 in place and, in connection with this invention, also provides a convenient mounting location for sensor module 306, as will be discussed below.

In a preferred embodiment, sensor module 306 comprises a magnetic torque sensor. Magnetic sensor technology operates optimally in combination with a free, smooth surface area of drive plate 204, wherein drive plate 204 has a controlled hardness and wherein a part of drive plate 204 is magnetized. The magnetic sensor technology makes use of magnetic flux sensing elements 312, such as fluxgate sensors. Sensing elements 312 are preferably stationary and fixed with respect to the rotating, magnetized surface of drive plate 204. Translation of drive plate 204 in either an axial or radial direction relative to sensor module 306 is preferably minimized. Conventional transmission designs may represent a challenge for the packaging of such magnetic sensors.

In a particularly preferred embodiment, sensor module 306 comprises a magneto-elastic torque sensor. Such sensors are described in U.S. Pat. No. 6,553,847 and U.S. Patent Application Publication Nos. 2013/0091960 and 2013/0263654, all of which are hereby incorporated by reference in their entirety. However, other magnetic sensors are also usable so long as they enable accurate measurements of torque exerted on drive plate 204 without physical contact between sensing element 312 of sensor module 306 and drive plate 204.

Figure 5:
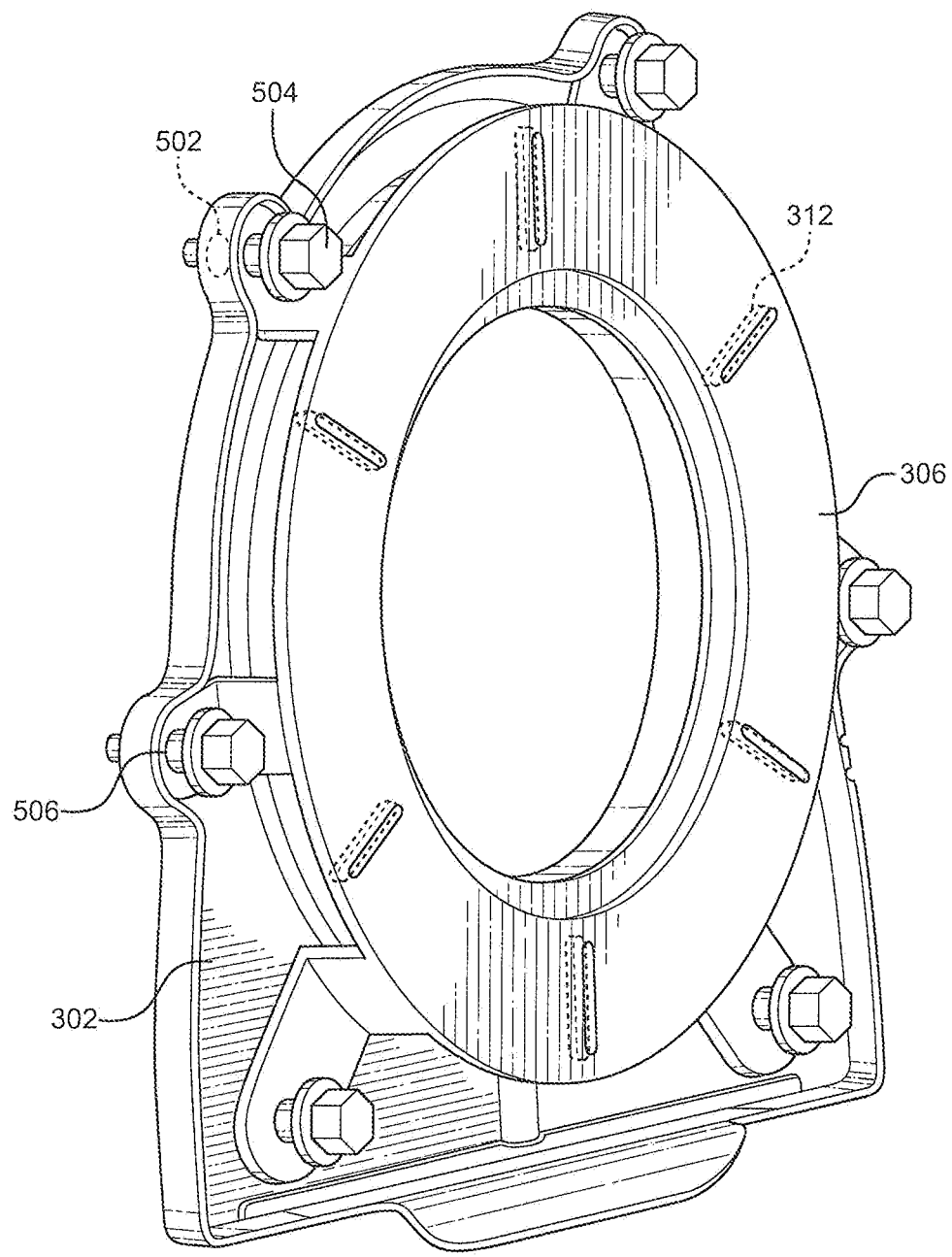
FIG. 5 is a perspective view of the sensor module.
Figure 6:
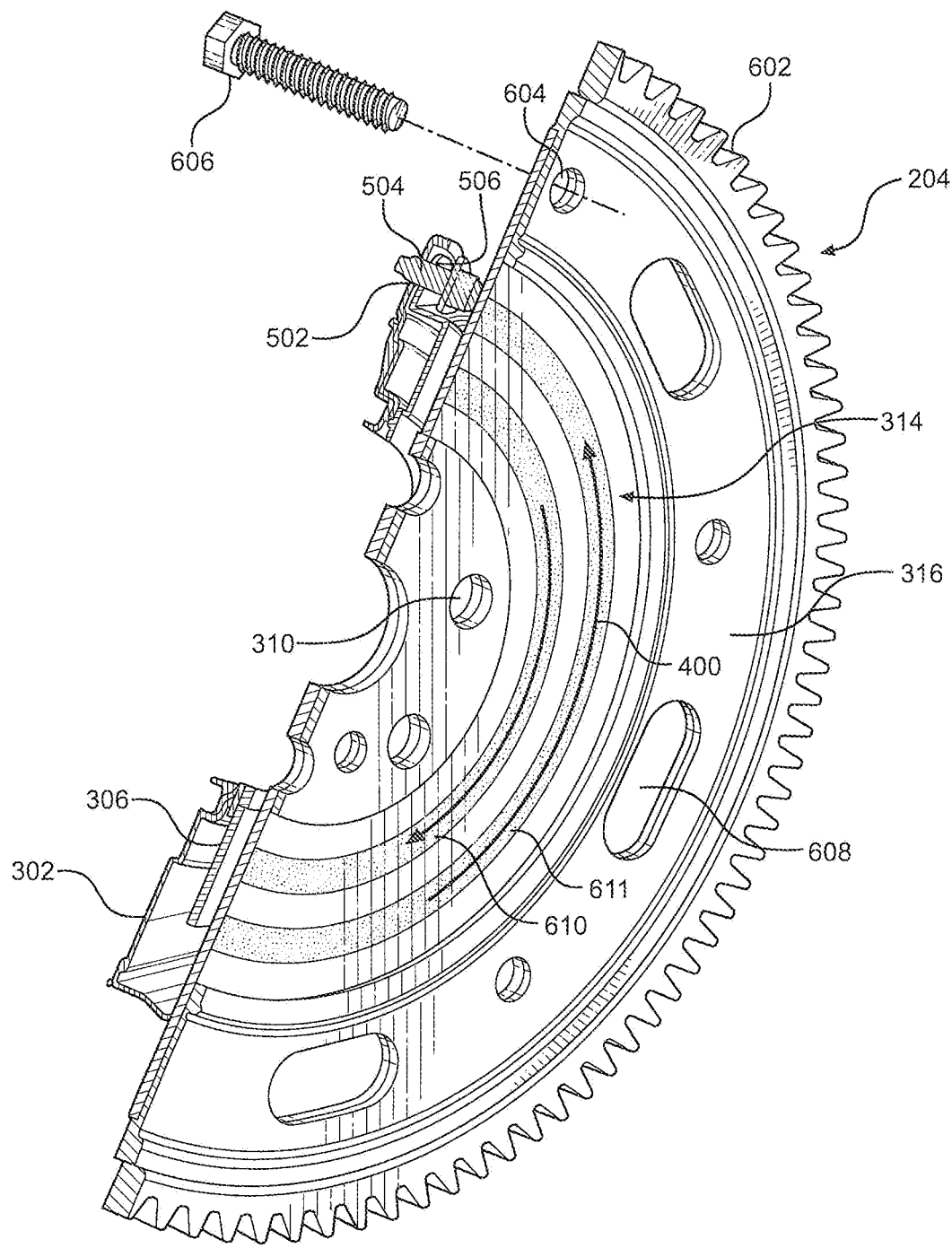
FIG. 6 is an exploded, perspective, cross-sectional view of the sensor module and drive plate.

Sensor module 306 includes at least one magnetic flux sensing element 312 (e.g., a fluxgate) while the embodiment shown in FIGS. 3 and 5-6 includes six such sensing elements 312. Additionally, sensor module 306 includes other components typically found in a magneto-elastic, torque sensor, such as a printed circuit board, a controller or a transceiver (not shown), for example. Drive plate 204 includes a central, magnetized disk portion 314 that is coupled to an outer, ring portion 316. Sensor module 306 is fixedly coupled to oil seal housing 302 in a position adjacent to magnetized portion 314 of drive plate 204 in order to enable sensing element 312 to sense a torque-induced signal. There is a small air gap between sensor module 306 and magnetized portion 314 so that drive plate 204 is allowed to rotate easily relative to sensor module 306. However, this air gap is preferably small so that sensing element 312 can sense the torque-induced signal. In a preferred embodiment, the air gap is on the order of 3 mm.

Figure 4A:
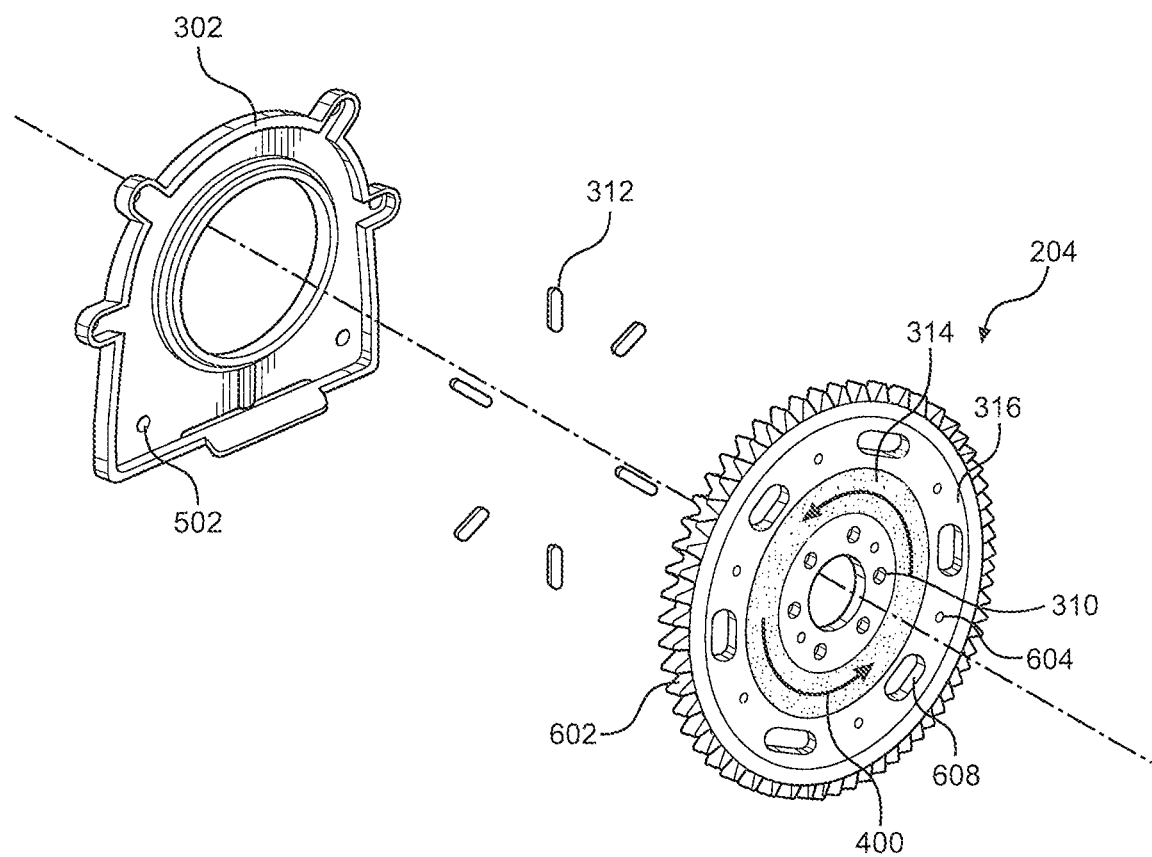
FIGS. 4A-C are examples of a magnetic torque sensor detecting a torque exerted on the drive plate in accordance with the present invention.
Figure 4B:
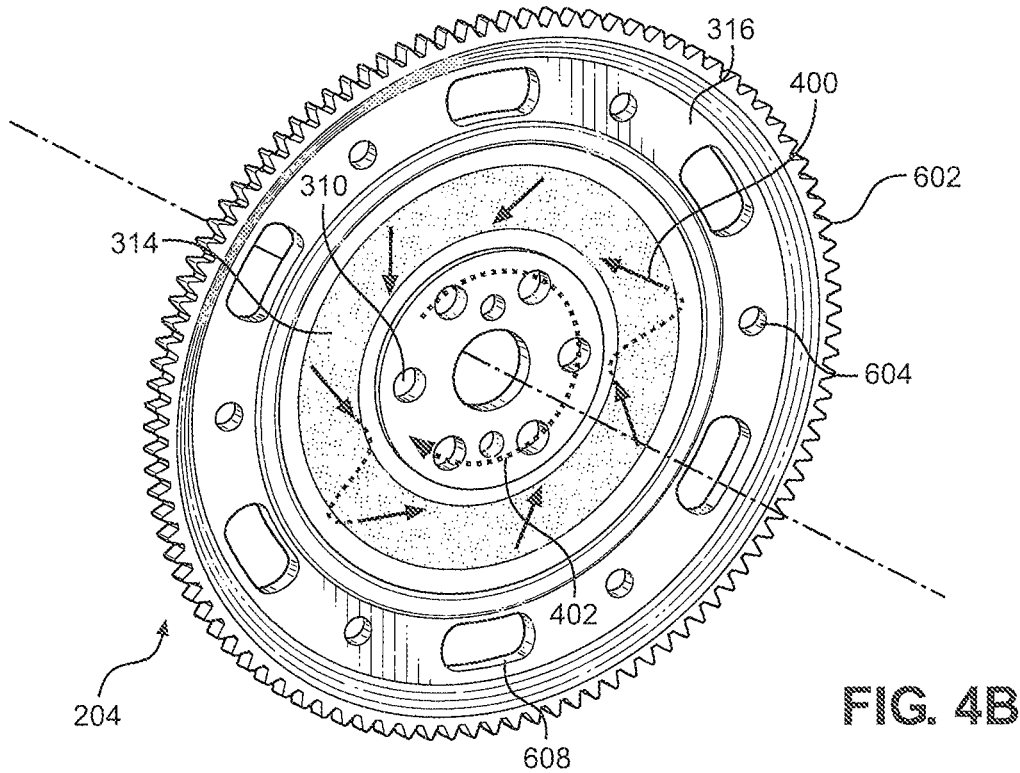
Figure 4C:
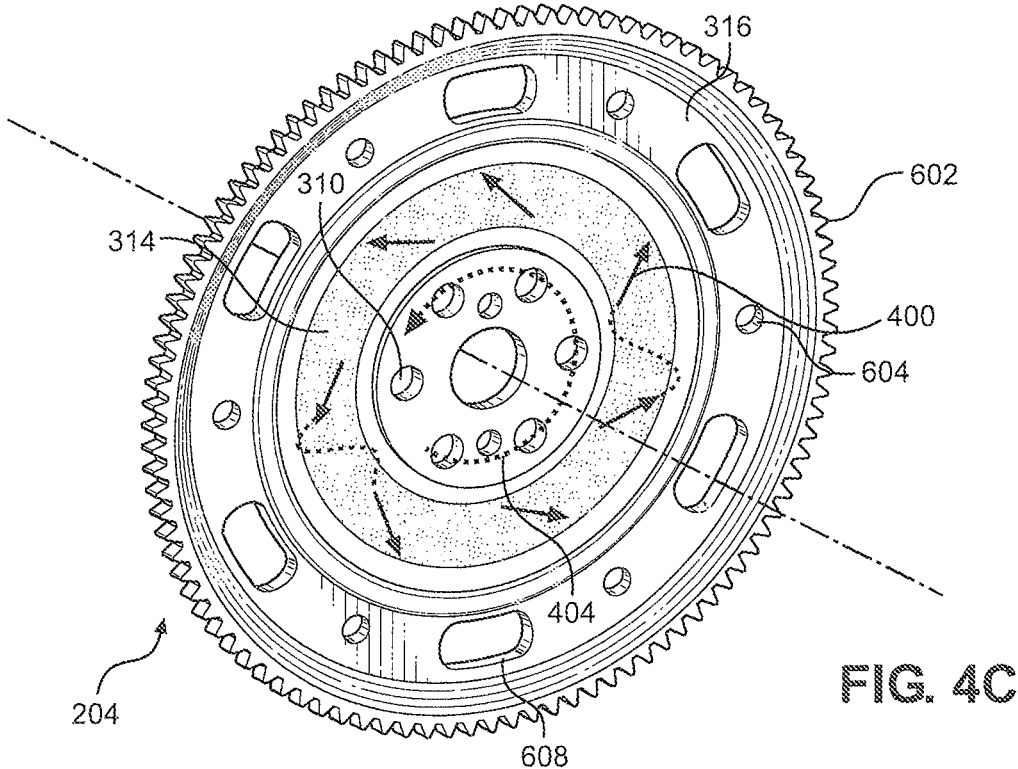

The illustrations in FIGS. 4A-C are simplified views of flux direction with only a single magnetized portion 314 shown for clarity. However, depending on chosen magnetization patterns, magnetic flux 400 may have more complex directional patterns. In a preferred embodiment, which will be discussed in more detail in connection with FIG. 6, magnetized portion 314 includes two magnetized portions with opposite polarities such that magnetic flux 400 moves in one direction in the first magnetized portion and the opposite direction in the second magnetized portion. When no load is applied to drive plate 204, as shown in FIG. 4A, magnetic flux 400 is contained near or within the surface of magnetized portion 314. When a load is applied drive plate 204 is rotated by crankshaft 202 against the resistance of the first and second clutches), magnetic flux 400 extends from the surface of magnetized portion 314 and its axial component, which is proportional to an applied torque, is measured by sensing element 312. This is shown in FIGS. 4B-C, with solid arrows indicating magnetic flux 400 within magnetized portion 314 and the broken portions of these arrows indicating magnetic flux 400 in the air. Also demonstrated in FIGS. 4B-C is how magnetic flux 400 moves in one direction when torque is applied to drive plate 204 in a first direction (shown by arrow 402 in FIG. 4B) and magnetic flux 400 moves in another direction when torque is applied to drive plate 204 in a second direction (shown by arrow 404 in FIG. 4C). Applying torque in either direction causes more magnetic flux 400 to come out from the surface of magnetized portion 314 in proportion to the load exerted on drive plate 204. Sensing element 312 detects the magnetic flux direction and intensity. Variations of this technology may include, for example, dual band and tri-band magneto-elastic torque sensors.

With reference now to FIG. 5, there is shown a mounting arrangement for sensor module 306 and oil seal housing 302. Oil seal housing 302 has at least one oil seal mounting hole 502 located therein for coupling oil seal housing 302 to power source 102. A fastener 504, such as a bolt, is inserted into oil sealing mounting hole 502 and then rotated until tightened so that oil seal housing 302 is securely coupled to power source 102. Similarly, sensor module 306 has at least one sensor module mounting hole 506. Sensor module mounting hole 506 is positioned so that, when sensor module 306 is placed adjacent to oil seal housing 302, sensor module mounting hole 506 is preferably aligned with oil seal mounting hole 502. As a result, a single fastener 504 is used for both mounting holes 502, 506 and, hence, can securely couple both oil seal housing 302 and sensor module 306 to power source 102. In the embodiment shown in FIG. 5, sensor module 306 has a plurality of sensor module mounting holes 506 that are aligned with a plurality of oil seal mounting holes 502 formed in oil seal housing 302. A plurality of fasteners 504 are inserted in mounting holes 502, 506 to simultaneously and securely couple both sensor module 306 and oil seal housing 302 to power source 102. Such an arrangement reduces the number of parts required while also minimizing assembly time. In particular, it should be noted that no separate mounting assembly need be provided for sensor module 306 since sensor module 306 can make use of the mounting assembly of oil seal housing 302. As a result, sensor module 306 is contained in a protected space between power source 102 and transmission 104, thereby protecting sensor module 306 from undesirable environmental effects, such as excessive moisture. In an alternative embodiment, sensor module 306 is formed integrally with oil seal housing 302, which further simplifies assembly and reduces the number of parts required.

With reference now to FIG. 6, drive plate 204 can be seen in greater detail. As discussed above, drive plate 204 is comprised of central, magnetized disk portion 314 and outer, ring portion 316. Additionally, drive plate 204 includes crankshaft mounting holes 310 for coupling drive plate 204 to crankshaft 202. A plurality of teeth 602 is coupled to an outer periphery of ring portion 316 for engaging a starter motor (not shown). Drive plate 204 is further configured to transfer rotational energy to clutch housing 206. In order to accomplish this, drive plate 204 preferably includes clutch mounting holes 604, which accept fasteners 606, such as bolts, for coupling drive plate 204 to clutch housing 206. In addition to crankshaft mounting holes 310 and clutch mounting holes 604, drive plate 204 preferably includes a plurality of cutouts 608, which reduce the weight of drive plate 204. Thus, power source 102 is coupled to drive plate 204 at the center via crankshaft 202, and drive plate 204 is, in turn, coupled to clutch housing 206 near the rim so that power source 102 drives clutch housing 206 through drive plate 204.

In one preferred embodiment, magnetized portion 314 of drive plate 204 includes first and second concentric magnetized portions 610, 611. Magnetic flux 400 travels clockwise in first concentric magnetized portion 610 and counter-clockwise in second concentric magnetized portion 611. However, in an alternate embodiment, the directions are reversed. The direction of travel of magnetic flux 400 is generally determined by the polarity of magnetized portion 314 or, in this particular embodiment, the polarity of first and second concentric magnetized portions 610, 611. When a load is applied to drive plate 204 having first and second concentric magnetized portions 610, 611, magnetic flux 400 will generally travel as it does in FIGS. 4B-C except that there will be two sets of magnetic flux 400, one traveling in a clockwise direction and one traveling in a counter-clockwise direction.

The two-piece design of drive plate 204 allows for the use of a structurally stronger, magnetizable material for magnetized portion 314, which enables magnetized portion 314 to be significantly thinner than ring portion 316. Because magnetized portion 314 is thinner, it is easier to machine, such as by stamping, and less material is required to form it, which reduces material costs. Additionally, the thinner construction of magnetized portion 314 allows a higher strain level for an improved signal-to-noise ratio of sensor module 306. The two-piece design also avoids the need to weld two dissimilar materials, since only ring portion 316 needs to be welded to the plurality of teeth 602, and both are typically made of a similar material.

Furthermore, the two-piece design allows ring portion 316 to be designed independently from magnetized portion 314. As a result, the thickness of ring portion 316 is independently adjustable to achieve a desired inertia level. Other desired drive plate 204 mechanical functions can also be achieved. For example, design changes and adjustments can be made to the centering and alignment when used with power source 102 and transmission 104 having tight tolerances. Also, the cooling provided by cutouts 608 in drive plate 204 can be modified.

In a preferred embodiment, magnetized portion 314 and ring portion 316 of drive plate 204 are assembled by press-fitting, with magnetized portion 314 formed of magnetizable stainless steel and ring portion 316 formed of conventional steel. Preferably, ring portion 316 is constructed by stamping, machining and welding, while inner piece is simply stamped from magnetizable sheet material. Mating surfaces of portions 314, 316 are designed to allow cylindrical surface-to-surface contact at a desired stress level required for press-fitting. Portions 314, 316 are kept together for easy and safe shipping, as well as easy vehicle-level assembly. During assembly, portions 314, 316 are coupled to clutch housing 206 by fasteners 606 through common, aligned clutch mounting holes 604.

In an alternate embodiment, magnetized portion 314 and ring portion 316 are kept together during shipping using a temporary plug or retention clip (not shown) with alignment holes, marks or tabs. During final assembly, the plug or clip would be removed, and fasteners 606 would be inserted into clutch mounting holes 604.

Based on the above, it should be readily apparent that the present invention provides a way to directly measure torque at a drive plate of a dual-clutch automatic transmission. Although described with reference to preferred embodiments of the invention, it should be readily understood that various changes or modifications could be made to the invention without departing from the spirit thereof. For instance, although the preferred embodiments of the invention are described with respect to a vehicle 100 having a power source 102, a dual-clutch automatic transmission 104 and a drive plate 204, it should be appreciated and understood that the present invention can be adapted for beneficial use with any motor-driven vehicle having a disk-shaped element, such as a flex plate or flywheel and, as such, the term drive plate, as used herein, includes any disk-shaped element used to transfer engine torque within a powertrain, including conventional flex plates and flywheels. In general, the invention is only intended to be limited by the scope of the following claims.

The invention claimed is:

1. A torque sensor assembly for a motor vehicle comprising:
    a drive plate including:
        a central disk; and
        an outer ring coupled to the central disk; and
    a magnetic torque sensor spaced from the drive plate and configured to determine an amount of torque exerted on the central disk by sensing a magnetic flux passing through the central disk, wherein the central disk includes a first magnetizable material that is magnetized, the outer ring includes a second material that is different from the first material and the first material is stronger than the second material.

2. The torque sensor assembly of claim 1, wherein the central disk is thinner than the outer ring and the drive plate is assembled by press-fitting the central disk to the outer ring.

3. The torque sensor assembly of claim 1, wherein the magnetic torque sensor is a magneto-elastic torque sensor.

4. The torque sensor assembly of claim 1, wherein the magnetic torque sensor includes magnetic flux sensing elements.

5. The torque sensor assembly of claim 4, wherein the magnetic flux sensing elements are fluxgate sensors.

6. The torque sensor assembly of claim 4, wherein the magnetic torque sensor is configured to determine the amount of torque exerted on the central disk by measuring, via the magnetic flux sensing elements, the magnetic flux extending from the central disk.

7. A motor vehicle including a powertrain having a power source, the motor vehicle comprising:
    a drive plate coupled to the power source and including:
        a central disk; and
        an outer ring coupled to the central disk;
    a sensor configured to determine an amount of torque exerted on the central disk by sensing a magnetic flux passing through the central disk; and
    an oil seal housing coupled to the power source, wherein the sensor is coupled to the oil seal housing.

8. The powertrain of claim 7, wherein the central disk includes a first magnetizable material that is magnetized and the outer ring includes a second material that is different from the first material.

9. The powertrain of claim 8, wherein the first material is stronger than the second material, the central disk is thinner than the outer ring and the drive plate is assembled by press-fitting the central disk to the outer ring.

10. The powertrain of claim 7, wherein the sensor is a magneto-elastic torque sensor.

11. The powertrain of claim 7, wherein the sensor includes magnetic flux sensing elements.

12. The powertrain of claim 11, wherein the magnetic flux sensing elements are fluxgate sensors.

13. The powertrain of claim 11, wherein the sensor is configured to determine the amount of torque exerted on the central disk by measuring, via the magnetic flux sensing elements, the magnetic flux extending from the central disk.

14. The powertrain of claim 7, further comprising a fastener, and wherein:
    the oil seal housing has a first mounting hole and the sensor has a second mounting hole; and
    the fastener is inserted into both the first mounting hole and the second mounting hole to couple both the oil seal housing and the sensor to the power source.

15. A method for measuring torque in a powertrain of a motor vehicle, the powertrain including a power source, a drive plate coupled to the power source, an oil seal housing coupled to the power source and a sensor coupled to the oil seal housing, the method comprising:
    measuring, with the sensor, a magnetic flux passing through the drive plate; and
    determining an amount of torque exerted on the drive plate.

16. The method of claim 15, further comprising coupling a central magnetized disk to an outer ring to form the drive plate, and wherein measuring a magnetic flux includes measuring the magnetic flux passing through the central magnetized disk.

17. The method of claim 15, wherein the sensor includes a first mounting hole and the oil seal housing includes a second mounting hole, and wherein coupling the sensor to the oil seal housing is accomplished by inserting a fastener into both the first mounting hole and the second mounting hole.

18. The method of claim 16, further comprising:
    forming the central disk from a first material; and
    forming the outer ring from a second material that is different from the first material, wherein the first material is stronger than the second material.

19. The method of claim 18, wherein the central disk is thinner than the outer ring, the method further comprising:
    assembling the drive plate by press-fitting the central disk to the outer ring.

* * * * *